United States Patent Office 2,713,921
Patented July 26, 1955

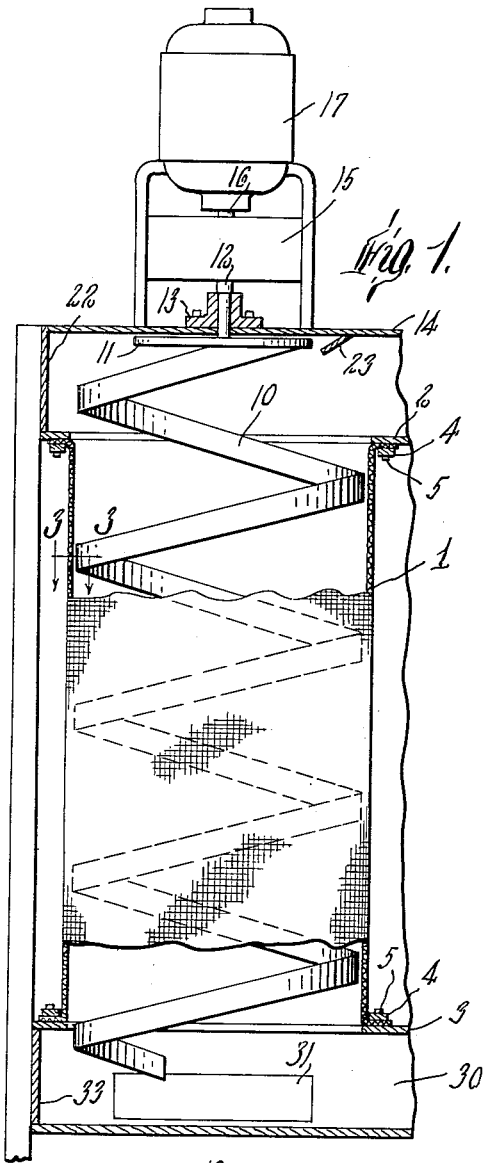
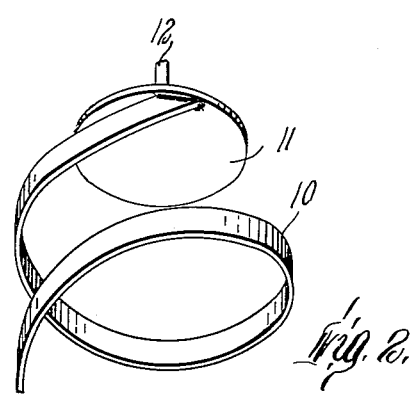
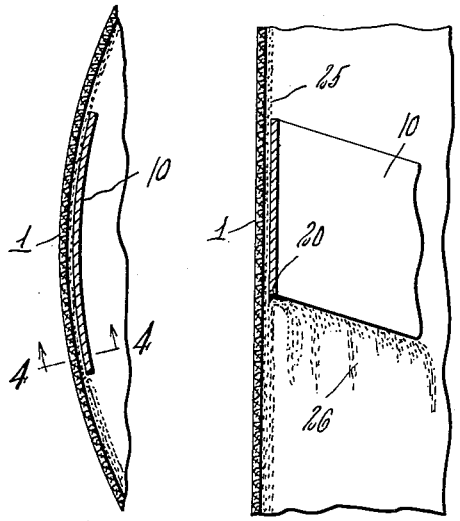
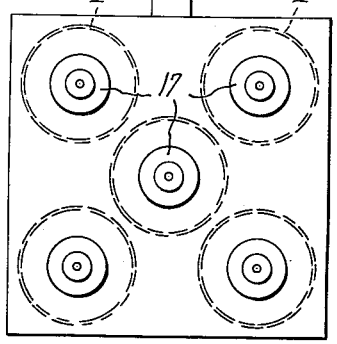
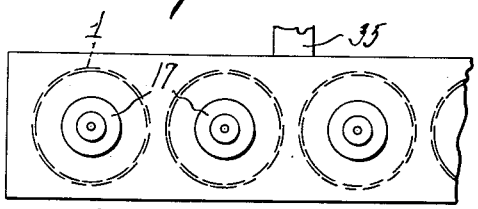

2,713,921

FILTER MEANS FOR COLLECTING AND RECOVERING AIR-BORNE FIBROUS AND OTHER MATERIAL

John Turner, Boston, Mass.

Application August 27, 1952, Serial No. 306,658

10 Claims. (Cl. 183—60)

This application is a continuation-in-part of my application Serial Number 254,717, filed November 3, 1951, and now abandoned.

This invention relates to a filter mechanism for collecting and recovering fibrous and other solid material from air, the recovery of which results not only in the salvage of otherwise waste material but also in the purification of the air so that it may be safely breathed. Lint or other fibrous material floating in the air in textile mills has heretofore formed a serious health hazard and its removal and recovery represent not only an important safety measure but also salvage of substantial value.

There is also a serious problem in connection with the filtering out from air of hot, solid materials. By the use of high temperature resistant materials, this invention is also applicable to high temperature conditions.

In accordance with this invention the fiber or dust-laden air is caused to pass through a fabric which receives a coating of the fibers or other particles on the face against which the air so laden strikes. This coating soon builds up so that, together with the fabric, it forms an effective filter which holds back the solid matter but permits the passage of air which escapes through the fabric into the room or other space.

Means are also provided for removing from time to time the major portion of the deposit of solid materials, leaving only an amount which closely adheres to and forms with the fabric an effective filter.

The deposit-removing means is also an important feature of this invention.

For a complete understanding of the invention, reference may be had to the accompanying drawings in which:

Figure 1 is a view partly in side elevation and partly broken away of a single filtering unit.

Figure 2 is a fragmentary perspective view of a deposit-removing means.

Figure 3 is a detail sectional view to a much larger scale on line 3—3 of Figure 1.

Figure 4 is a detail sectional view on line 4—4 of Figure 3 showing the manner in which excess thickness of the fibrous deposit is removed from the filter.

Figures 5 and 6 are somewhat diagrammatic views showing different arrangements of multiple filtering units.

Figures 1 to 4 show a single filtering unit, such unit comprising a tube of fabric which is supported at its upper and lower ends on plates 2 and 3, respectively, the end margins of the two being shown as outwardly turned and secured thereto by any suitable means such as retainer rings 4 secured by screws 5.

Where solid materials which may include fibrous material at comparatively low temperatures are to be filtered, print cloth from 80 to 92 count is quite satisfactory as the fabric. Where high temperature material is to be handled, a satisfactory fabric is woven fiber glass which will withstand temperatures as high as 600° F. and above. One such material found very satisfactory in service is sold under the trade name "Maco" and made by Menardi & Co. of El Segundo, California, and comprises silicone impregnated fiber glass.

Within the tube 1, which may well be 12" to 18" in diameter, there is positioned a flexible spiral bar 10. Where materials at atmospheric temperatures are being treated this may well be formed of black iron strapping of, say, 14 gage and may be of, say, 2½ to 2¼ inches in width.

Another material suitable for the spiral bar for both atmospheric and high temperatures is semi-hard aluminum which has the further advantage of light weight which permits the fabrication of longer spirals without downward stretch and of great sensitivity to contact with the flexible fabric tube.

However, this bar may taper slightly, say, for example, ¼ inch in a total length of 8 feet, the wider portion being at its upper end. This bar is arranged substantially coaxial within the tube 1 and its lower end need not be supported. Its upper end is secured to means by which the spiral bar may be rotated about its longitudinal axis. As shown, for this purpose, the upper end of the bar 10 may be welded to the lower face of a disk 11 to which is secured a central shaft 12. This shaft 12 extends through a suitable bearing 13 mounted on an upper plate 14 and this is connected through a suitable reducing gear at 15 to a motor shaft 16 of a motor 17. The parts are so arranged that the bar 10 is rotated, say, once every 30 seconds. The lower outer edge of the spiral bar is formed as a scraping edge at 20 (see Figure 4). The bearing portion of the bearing 13, particularly when high temperature materials are being treated may be of a self-lubricating type which needs no oil, as for example, one made of tetrafluoroethylene resin such as that known commercially as "Teflon" made by the du Pont Company of Wilmington, Delaware.

The air laden with fibers and/or other solid materials which it is desired to remove is introduced into the upper end of the tube 1 as through the conduit formed by the spaced plates 2 and 14 and the side wall members 22. Preferably a baffle 23 depends from the upper plate 14 so as to deflect the solids-laden air away from the disk 11 so as to avoid as much as possible accumulating solid material on the disk.

When the apparatus is first put into operation, the fiber or dust-laden air passes into the fabric tube and much of any dust which may be contained therein blows out through the fabric side wall. However, there soon accumulates on the inner face of the tube a deposit of the fibers or dust, or both, which are more or less matted together, and this, together with the fabric, soon forms a filtering medium which is effective to retain substantially all the solid materials contained in the air but which allows the air itself to pass therethrough.

The deposit of solid materials builds up on the inner wall of the tube and if this were allowed to continue indefinitely the filter would soon become clogged. However, the spiral bar 20 in its rotation in unscrewing direction causes the lower edge 20 to scrape off excess accumulation of the solid materials, leaving only a layer indicated at 25 in Figure 4 of sufficient thickness to act with the fabric as an effective air filtering medium. The material removed from the blade 10 from this coating, as shown at 26 in Figure 4, drops down into the normally closed receptacle 30 beneath the lower end of the filter tube 1 from which it may be removed from time to time as through a removable door 31. The upper wall of this receptacle 30 is formed by the plate 3, its lower and side walls being formed by other plates 32 and 33.

In case fibers in the air are sufficiently long to become draped over the upper edge of the bar 10, the gradual narrowing of this bar in downward direction prevents these fibers from becoming wound and matted around the bar tightly so that they find their way down along the bar and are ultimately discharged therefrom at this lower end, which is unobstructed by bearings or other parts and hangs free so that the fibers and other solids carried thereby may readily pass off therefrom together with the fibrous and other solid materials which may be scraped off from the inner wall of the tube.

It will be noted that the spiral bar is of slightly smaller diameter than the fabric tube so that it does not actually contact the tube. Thus it may be $1/16''$ to $1/8''$ smaller in diameter. This is important as it removes vibration and abrasion from the fabric which the fabric, particularly that made of fiber glass, cannot well withstand. This freedom from rubbing or abrasive action is further insured by the absence of any axial support for the bar 10 which is internally open and unobstructed and is sufficiently flexible to conform easily to the fabric tube without actual rubbing contact therewith. Particularly when the air contains fibrous material, the absence of such a central stem also avoids the presence of parts upon which the fibrous material might collect and build up to obstruct free passage of the material into and through the apparatus. It will be noted, further, that the bar is supported by a single bearing and at its upper end only, and particularly when high temperatures are to be expected, this bearing may be made of anti-friction material requiring no lubrication as hereinbefore specified.

In Figures 5 and 6 different arrangements of multiple units are shown, each unit comprising a fabric tube 1 with its spiral bar 10. Since the motor 17 is called upon for a very light load, a small, cheap motor may be employed and an individual motor for each unit may be employed to advantage though, of course, if desired, the several bars 10 can be driven from a single motor, being suitably connected thereto by driving mechanism as is well understood.

In Figure 5 one arrangement of five filtering units in square array has been illustrated. In Figure 6 the various units are arranged in line, each one drawing its supply of air to be filtered from a single source through the pipe 35 and each depositing into either an individual or a common chamber 30.

From the foregoing description of certain embodiments of this invention it will be evident to those skilled in the art that various changes and modifications may be made without departing from its spirit or scope.

I claim:

1. A filter comprising a tube of flexible fabric material, means introducing air laden with solid material into one end of said tube, a flexible spiral bar of slightly less external diameter than the internal diameter of said tube arranged within said tube, and means connected to said bar for rotating said bar, the interior of said spiral bar being open and unobstructed and the lower end of said bar being free whereby solid materials carried thereby may readily pass off therefrom.

2. A filter comprising an upright tube of flexible woven material, means for introducing air laden with solid material into the upper end of said tube, a flexible spiral bar of slightly less external diameter than the interior diameter of said tube arranged within said tube, and means connected to the upper end of said bar for rotating said bar, the interior of said spiral bar being open and unobstructed and the lower end of said bar being free whereby solid materials carried thereby may readily pass off therefrom.

3. A filter comprising a flexible fabric tube of fiber glass, means for introducing air laden with solid material into one end of said tube, a flexible spiral bar of slightly less external diameter than the interior diameter of said tube arranged within said tube, and means connected to the upper end only of said bar for rotating said bar and the lower end of said bar being free whereby solid materials carried thereby may readily pass off therefrom.

4. A filter comprising an upright flexible fabric tube of fiber glass, means for introducing air laden with solid material into the upper end of said tube, a flexible spiral bar of slightly less external diameter than the internal diameter of said tube arranged within said tube, and means connected to the upper end only of said bar for rotating said bar, said bar being free to flex and the lower end of said bar being free whereby solid materials carried thereby may readily pass off therefrom.

5. A filter for removing fibrous and other solid matter from air which comprises a tube of print cloth, means for introducing fiber-laden air into one end of said tube, a flexible spiral bar internally open and unobstructed and of slightly less external diameter than the internal diameter of said tube arranged substantially coaxial within said tube, and means connected to its upper end for rotating said bar about said axis the lower end of said bar being free whereby fibers carried by said bar may readily pass off therefrom.

6. A filter for removing solids including fibers from air, which comprises a fabric tube, means supporting said tube with its axis substantially vertical, means for introducing air containing such solids into the upper end of said tube, the air freed from solids escaping through the side wall of said tube, a flexible spiral bar of slightly less external diameter than the internal diameter of said tube arranged substantially coaxial within said tube and presenting a scraping lower outer edge and downwardly tapered, said bar being open and unobstructed internally and its lower end being free whereby fibers and other solids carried thereby may pass off therefrom, means connected to the upper end of said bar for turning said bar in unscrewing direction, and means for collecting the fibers and other solids from the lower end of said tube.

7. A filter for removing solids including fibers from air which comprises a tube of print cloth, means supporting said tube with its axis substantially vertical, means for introducing air containing such solids into the upper end of said tube, the air freed from solids escaping through the side wall of said tube, a flexible spiral bar of slightly less external diameter than the internal diameter of said tube arranged substantially coaxial within said tube and presenting a scraping lower outer edge and downwardly tapered, said bar being open and unobstructed internally and its lower end being free whereby fibers and other solids carried thereby may pass off therefrom, means connected to the upper end of said bar for turning said bar in unscrewing direction, and means for collecting the fibers and other solids from the lower end of said tube.

8. A filter for removing fibers from air, which comprises a filter tube, means supporting said tube with its axis substantially vertical, means for introducing fiber-laden air into the upper end of said tube, the air freed from fiber escaping through the side wall of said tube, a flexible spiral bar internally open and unobstructed and of slightly less external diameter than the internal diameter of said tube arranged substantially coaxial within said tube and presenting a scraping lower outer edge, means connected to the upper end of said bar for turning said bar in unscrewing direction, and means for collecting the fibers from the lower end of said tube, said bar tapering in width and having its wider portion adjacent to the upper end of said tube.

9. A filter for removing fibers from air which comprises a tube of print cloth, means supporting said tube with its axis substantially vertical, means for introducing fiber-laden air into the upper end of said tube, the air freed from fiber escaping through the side wall of said tube, a flexible spiral bar internally open and unobstructed and of slightly less external diameter than the internal diameter of said tube arranged substantially coaxial within said tube and presenting a scraping lower outer edge, means connected to the upper end of said bar for turning said bar in unscrewing direction, and means for collecting the fibers from the lower end of said tube, said bar tapering in width and having its wider portion adjacent to the upper end of said tube.

10. In combination, an upper conduit, a lower receptacle, a fabric tube extending between said conduit and receptacle and adapted to receive air to be filtered from said conduit and to deposit solids into said receptacle, an internally unobstructed flexible spiral bar of slightly less external diameter than the internal diameter of said tube arranged substantially coaxially with said tube and tapering downwardly, and means connected thereto at its upper end for rotating said bar about its axis, the lower end of said bar hanging free whereby solids collected thereon may pass off freely therefrom.

References Cited in the file of this patent

UNITED STATES PATENTS

| | | |
|---|---|---|
| 232,122 | Hammesfahr | Sept. 14, 1880 |
| 1,738,717 | Matlock | Dec. 10, 1929 |
| 1,887,052 | Wendeln | Nov. 8, 1932 |
| 1,995,651 | Rathbun | Mar. 26, 1935 |
| 2,014,298 | Schneible | Sept. 10, 1935 |
| 2,167,236 | Gieseler | July 25, 1939 |
| 2,575,876 | Kausch | Nov. 20, 1951 |

FOREIGN PATENTS

| | | |
|---|---|---|
| 422,865 | Great Britain | Jan. 21, 1935 |
| 651,130 | Great Britain | Mar. 14, 1951 |